United States Patent [19]
Nakazawa et al.

[11] Patent Number: 5,756,019
[45] Date of Patent: May 26, 1998

[54] METHOD OF CONTROLLING MOLD CLAMPING FORCE FOR INJECTION MOLDING MACHINE

[75] Inventors: Makoto Nakazawa; Masahiko Miyajima, both of Nagano, Japan

[73] Assignee: Nissei Plastic Industrial Co., Ltd., Nagano-ken, Japan

[21] Appl. No.: 616,195

[22] Filed: Mar. 15, 1996

[30] Foreign Application Priority Data

Mar. 16, 1995 [JP] Japan ........................... 7-86135

[51] Int. Cl.⁶ .............................................. B29C 45/76
[52] U.S. Cl. ...................... 264/40.5; 264/328.1; 425/149
[58] Field of Search ............................ 264/40.1, 40.5, 264/328.1, 328.13; 425/149

[56] References Cited

U.S. PATENT DOCUMENTS

| | | | |
|---|---|---|---|
| 4,942,004 | 7/1990 | Catanzaro | 264/40.5 |
| 5,008,052 | 4/1991 | Harada | 264/40.5 |
| 5,102,587 | 4/1992 | Kumamura et al. | 264/40.5 |
| 5,346,657 | 9/1994 | Hara et al. | 264/40.5 |
| 5,451,363 | 9/1995 | Minamimura et al. | 264/328.13 |
| 5,549,857 | 8/1996 | Kamiguchi et al. | 264/40.5 |
| 5,554,326 | 9/1996 | Nakagawa et al. | 264/40.1 |
| 5,567,367 | 10/1996 | Ito et al. | 264/40.5 |

FOREIGN PATENT DOCUMENTS 6-198694  7/1994  Japan.

*Primary Examiner*—James P. Mackey
*Attorney, Agent, or Firm*—Birch, Stewart, Kolasch & Birch, LLP

[57] ABSTRACT

An injection pressure is detected as a pressure detection value Dp during injection and filling, and the thus obtained pressure detection value Dp is multiplied by a preset pre-determined coefficient so as to be converted into a desired mold clamping force Fc with which the mold clamping force is controlled. The desired mold clamping force Fc is set to a minimum value which a mold does not open, that is, the desired mold clamping force Fc is calculated with the use of $Fc=(\alpha*S*\beta)Dp$, where $\alpha$ is a charging rate of resin in a mold cavity, S is an entire projected area of a molding article, $\beta$ is a safety factor, and Dp is a pressure detection value Dp. With this arrangement, in a section where the injection pressure gradually increases from zero during injection and filling, the profile (variation curve) of mold clamping force gradually increases as the injection pressure varies. At this stage, the mold clamping force during injection and filling is set to a minimum value with which the mold does not open so that the power consumption can be minimized.

6 Claims, 4 Drawing Sheets

METHOD OF CONTROLLING MOLD CLAMPING FORCE FOR INJECTION MOLDING MACHINE

1. FIELD OF THE INVENTION

The present invention relates to a method of controlling a mold clamping force for an injection molding machine.

2. DESCRIPTION OF THE RELEVANT ART

In general, in the case of molding with the use of an injection molding machine, molten resin is metered, and then injected and filled in a mold cavity defined in a mold after the mold is clamped by a mold clamping device while a predetermined high pressure clamping force is applied to the mold in order to prevent the mold from opening by internal mold pressure during the filling.

Meanwhile, a method of controlling a mold clamping force generates a clamping force different from a section to a section during injection and filling.

For example, Japanese Laid-Open Patent No. 6-198694 discloses such a method of controlling a mold clamping force. In this method, a relatively small mold clamping force is generated until a preset time elapses during an injecting and filling step, and after the preset time elapses, a relatively large predetermined mold clamping force is generated. Accordingly, in a section where a relative small mold clamping force is generated, the mold slightly opens to relieve air and gas from the mold. Meanwhile, in a section in which a large mold clamping force is generated, the mold is completely closed so as to prevent a molding article from being burred.

However, the above-mentioned conventional mold clamping force control method has to be directed to enhance the molding function, but no consideration has been made for energy resource problems, environmental protection problems and the like. Accordingly, an excessive mold clamping force is generated, causing useless electrical energy consumption, that is, energy saving ability has been low, and further, a problem of blocking a mold has been caused due to application of useless stress.

3. SUMMARY OF THE INVENTION

One object of the present invention is to provide a method of controlling mold clamping force for an injection molding machine, which can eliminate useless power consumption and which can remarkably enhance the energy saving ability while preventing a mold from deteriorating.

Further, another object of the present invention is to provide a method of controlling mold clamping force for an injection molding device, which can establish a low pressure mold clamping condition during injection and filling so as to reduce inferior molding such as gas burning.

According to the present invention, there is provided a method of controlling mold clamping force, characterized by the steps of detecting an injection pressure during injection and filling, multiplying the thus detected pressure value Dp with a preset predetermined coefficient so as to convert the detected pressure value Dp into a desired mold clamping force value Fc, and controlling the mold clamping force in accordance with the thus obtained desired mold clamping force.

In this case, the desired mold clamping force value Fc is set to a minimum value with which a mold 1 does not open. Further, the desired mold clamping force Fc can be calculated with the use of the formula $Fc=(\alpha*S*\beta)Dp$ where $\alpha$ is a charging rate of resin in a mold cavity C, S is an entire projected area of a molding article, $\beta$ is a safety factor and Dp is a detected pressure value. It is noted that the charging rate of resin in the mold cavity C can use different constant charging rates which are set for respective sections obtained by dividing a screw position by a number n.

With this arrangement, in a section where the injection pressure gradually increases from the value of zero during injection and filling, the profile (variation curve) of mold clamping force gradually increases as the injection pressure varies. At this stage, the mold clamping force during injection and filling is set to a minimum value with which the mold 1 does not open, thereby it is possible to minimize the power consumption.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Next, a detailed explanation will be hereinbelow made of a preferred embodiment of the present invention with reference to the drawings.

Figure 3:
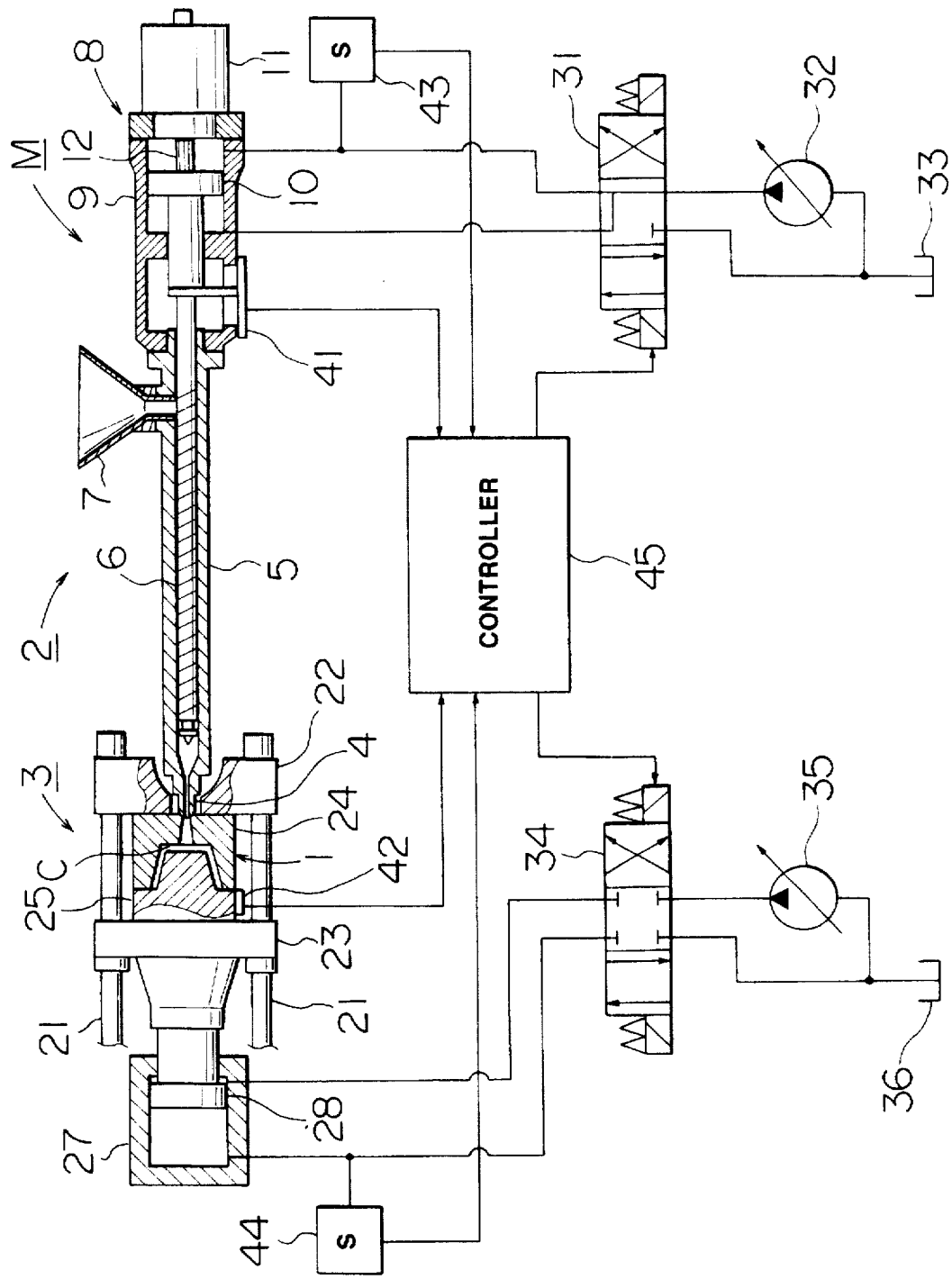
FIG. 3 is a partial block diagram illustrating an essential part of an injection molding machine in which the mold clamping force control method according to the present invention is carried out.

At first, referring to FIG. 3, the arrangement of an injection molding machine which can carry out a mold clamping force controlling method according to the present invention will be explained.

In this figure, the injection molding machine M incorporates of an injection device 2 and a mold clamping device 3. The injection device 2 is composed of a barrel cylinder 5 having at its front end an injection nozzle 5, a screw 6 incorporated in the barrel cylinder 5, and a hopper 7 provided in the rear part of the barrel cylinder 5, for feeding a molding material. Further, a screw drive device 8 is coupled to the rear end of the barrel cylinder 5. Further, a screw drive device 8 which is coupled to the rear end of the barrel cylinder 5, incorporates an injection cylinder 9 in which a piston 10 is incorporated. The screw 6 is coupled at its rear end to the front end of the piston 10, a rotary shaft 12 of an oil motor 11 attached to the rear end part of the injection cylinder 9 is spline-coupled to the rear end of the piston 10.

Meanwhile, the mold clamping device 3 incorporates a movable base 23 fixed to a plurality of parallel drivers 21, and the movable base 23 is slidably movable on the drivers 21. A stationary die 24 is attached to the stationary base 22, and a movable die 25 is attached to the movable base 23. Further, the stationary die 24 and the movable dies 25 constitute a mold 1 defining therein a mold cavity C. Further, a mold clamping cylinder 27 incorporates a piston 28 which is connected at its front end to the above-mentioned movable base 23.

Meanwhile, a front hydraulic chamber and a rear hydraulic chamber in the injection cylinder 9 are connected to a variable displacement pump 32 and an oil tank 33 through the intermediary of a selector valve 31, and a front hydraulic chamber and a rear hydraulic chamber in the mold clamping cylinder 27 are connected to a variable displacement pump 35 and an oil tank 36 through the intermediary of a selector valve 34. Further, a position detector 41 detects a position of the screw 6, a position detector 42 detects a position of the movable die 25, and a pressure detector 43 detects an injection pressure given by the screw 6. Further, a pressure detector 44 detects a molding clamping pressure. All these detectors are connected to a controller 45 for totally controlling the injection molding machine M. It is noted that the selector valves 31, 34 are changed over under the control of the controller 45.

Next, the mold clamping force controlling method according to the present invention will be explained with reference to FIGS. 4 and 5 which show flow-charts, and FIGS. 1 to 3.

Figure 4:
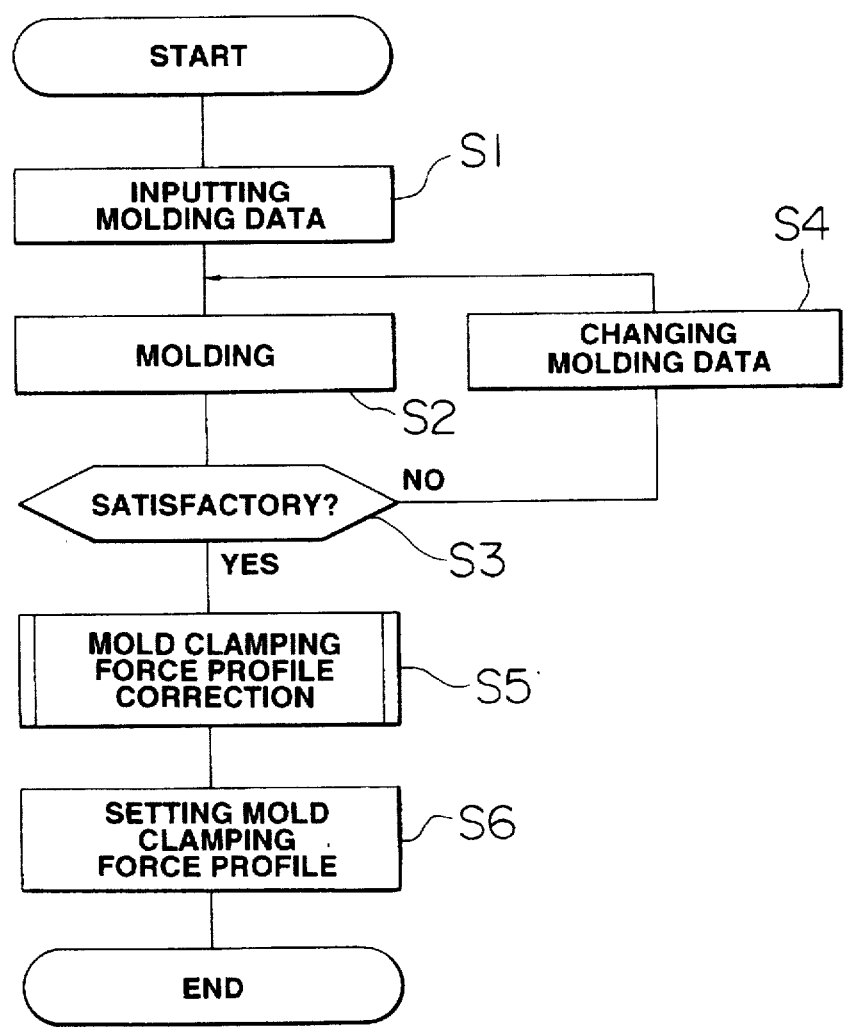
FIG. 4 is a flow-chart showing a procedure for carrying out the mold clamping force controlling method according to the present invention.
Figure 5:
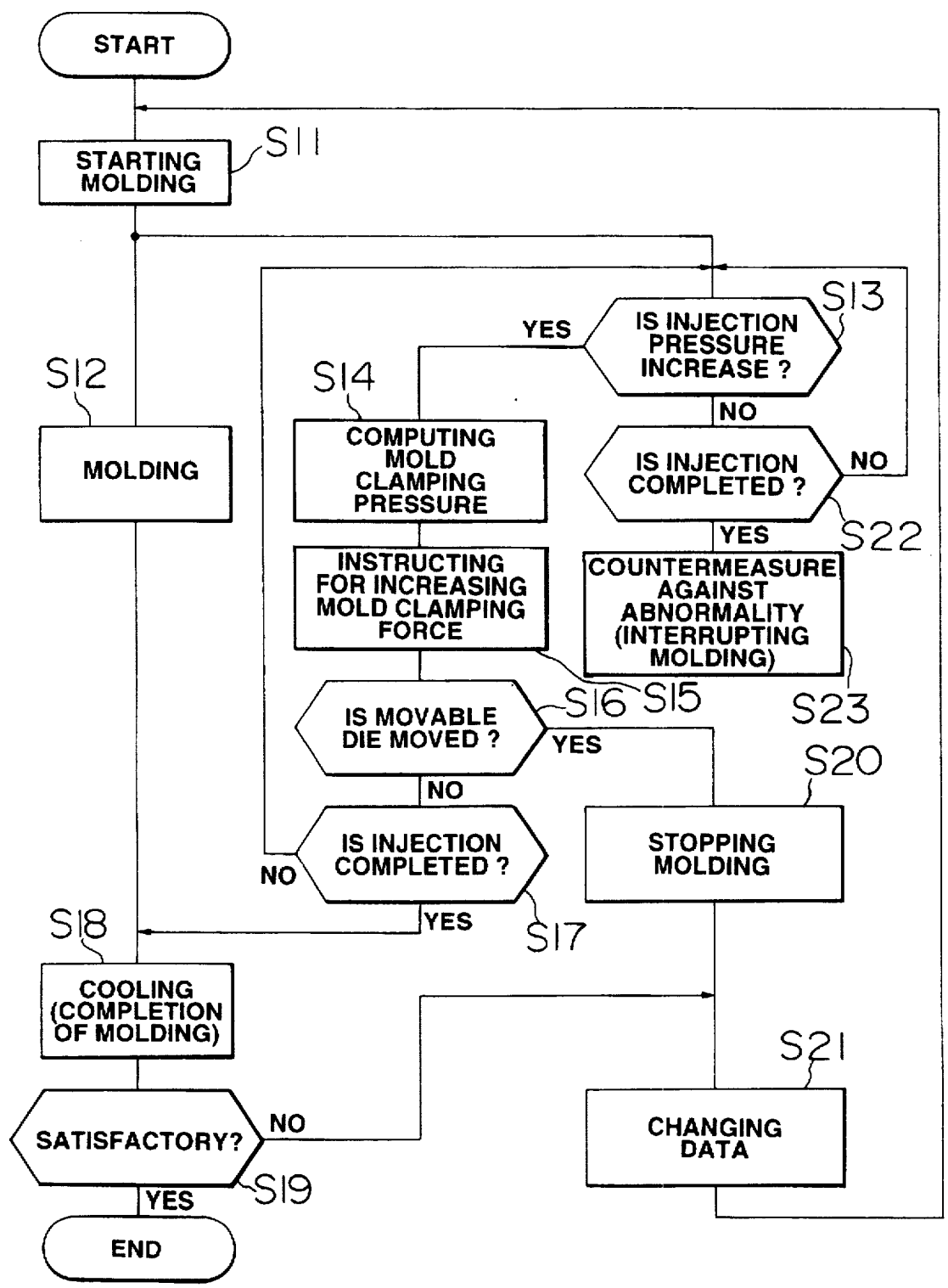
FIG. 5 is a flow-chart showing a process of correcting a profile of mold clamping force, for carrying out the mold clamping force controlling method according to the present invention.

At first, referring to FIG. 4 which show a flow-chart, several kinds of molding data are set to the controller 45 (step S1). As to several kinds of molding data, in addition to usual molding data such as a temperature, a speed, a pressure and a time, an entire projected area S of a molding article S and a safety factor β which are used in the mold clamping force controlling method according to the present invention are inputted. Further, in the controller 45, a charging rate α of resin in the mold cavity C is set. In this case, the charging rate α is preferably set to a value which continuously changes in accordance with a position (or time) of the screw 6. However, constant charging rates a which differs from a section to a section can be set among five sections, in total, into which the screw position is divided by a number of, for example, 5 (in general, it is divided by a number of n), as shown in FIG. 2. Specifically, The charging rate α is set to 0.0 in the first one of the five sections, 0.2 in the second one thereof, 0.4 in the third one, 0.6 in the forth one, and 0.8 in the fifth one. Then, the charging rate α is set to 1.0 at the termination of the fifth section. It is noted that the charging rate α is changed over in accordance with a position (or time) of the screw 6 which is detected by the position detector 41. Further, the thus set charging rate α is set in consideration with the safety factor β.

Figure 1:
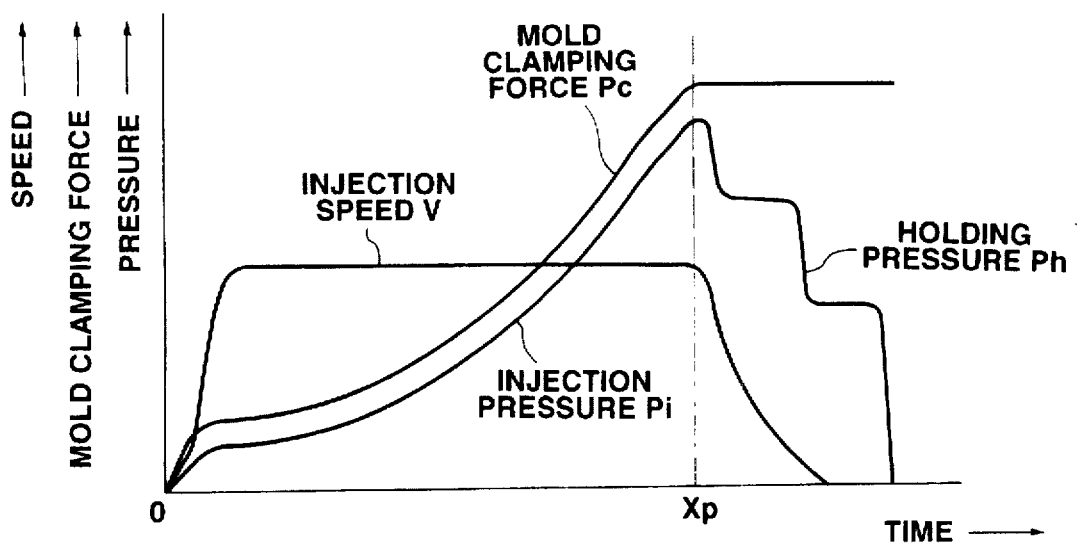
FIG. 1 is a view showing variation characteristics of injection pressure and mold clamping force obtained by a method of controlling mold clamping force, according to the present invention.
Figure 2:
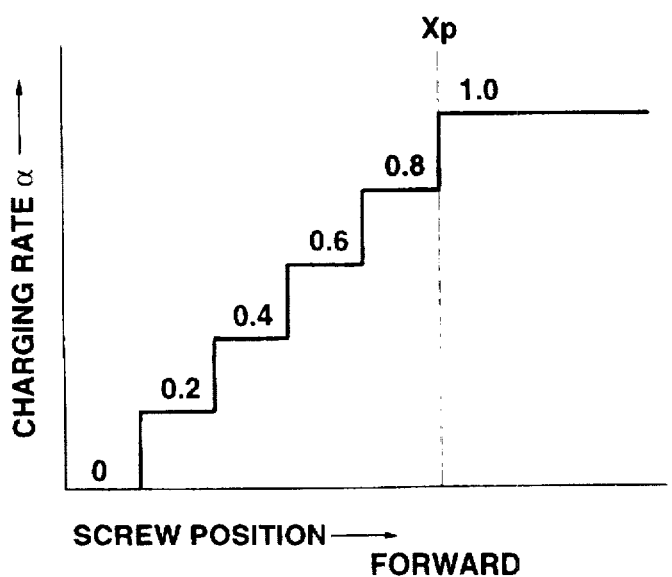
FIG. 2 is a view for explaining a process of setting a charging rate which is set by the mold clamping force controlling method according to the present invention.

By the way, as shown in FIG. 1, during an injection step, if the injection speed V is controlled so that it exhibits a predetermined speed characteristic (a constant speed in this embodiment), the injection pressure Pi gradually increases from the initiation of injection. Further, when the screw 6 reaches a speed and pressure change-over point Xp, the procedure is shifted into a pressure holding step at which a holding pressure Ph is given in accordance with a predetermined pressure characteristic (multi-stages in this embodiment). Accordingly, an injection pressure is detected so as to obtain a pressure detection value Dp during injection and filling, and then by multiplying the pressure detection value Dp with a preset predetermined coefficient, the pressure detection value Dp can be converted into a desired mold clamping force value Fc that is a minimum value with which the mold 1 does not open. That is, a safety factor β is selectively set, and the desired mold clamping force Fc is calculated with the use of Fc=(α*S*β)Dp. Thus, the profile of the mold clamping force Pc (mold clamping pressure) can be set so as to be slightly higher than the injection pressure Pi as shown in FIG. 1.

After completion of the input of the molding data, a primary molding is carried out (Step S2). At this stage, if a molding article having a satisfactory quality can be obtained, the inputted molding data are changed (Steps S3 and S4). Meanwhile, if a satisfactory molding article can be obtained, the profile of mold clamping force is adjusted (Steps S3 and S4).

Then the adjustment to the profile of mold clamping force will be explained with reference to FIG. 5 which shows a flow-chart.

At first, the mold clamping force is set to 0 (Step S11), and then, a secondary molding is carried out (Step S12). Meanwhile, the injection pressure Pi is detected by the pressure detector 43, and the thus obtained pressure detection value Dp is delivered to the controller 45. The controller 45 monitors the pressure detection value Dp, and multiplies the pressure detection value Dp, when it increases, with a preset predetermined detection value D so as to change the pressure detection value Dp into a desired mold clamping force value Fc. That is, the mold clamping force value Fc is calculated with the use of Fc =(α*S*β)Dp (Steps S13 and S14). The feed-back control for the mold clamping force is carried in accordance with the desired mold clamping force value Fc and a mold clamping pressure detected by the pressure detector 44 so as to make the mold clamping force coincident with the desired mold clamping force value Fc (Step S15). In this case, the position of the moveable die 25 is monitored by the position detector 42. If the injection is completed with no movement of the movable die 25, the thus obtained molding article is cooled down, thereby the molding is completed (Steps S16, S17 and S18).

Further, if the quality of the molding article is satisfactory, the profile obtained at this time is set as a regular profile which is then set in the controller 45 (Steps S19 and S6). It is noted that if the movable die 25 is moved during injection, that is, the mold clamping force is insufficient, the molding is interrupted, and the molding data are changed (Steps S16, S20, S21 and S22). Further, if no molding article having a satisfactory quality can be obtained, the molding data are also changed Steps S19 and S22). Meanwhile, if the injection is completed with no increase in the injection pressure Pi, a countermeasure for an abnormal event, such as interruption of the molding, is carried out (Steps S23 and S24).

Thus, during normal molding, the mold 1 is clamped by the mold clamping device 3, and the mold clamping force is set to 0. Further, the screw 6 is advanced to inject and fill molten resin into the mold cavity C while the injection pressure Pi during the injection is detected, and the desired mold clamping force value Fc is calculated from the thus obtained pressure detection value Dp, the charging rate α of resin in the mold cavity C, the entire projected area S of a molding article and the safety factor β. Then, the feed-back control for the mold clamping force is carried out in accordance with the thus obtained desired mold clamping force value Fc. In this case, the value of the charging rate α is changed in accordance with a position (or a time) of the screw 6, as shown in FIG. 2, and after the screw 6 reaches the speed and pressure change-over point Xp, the final mold clamping force (α=1) is held. Accordingly, in a section where the injection pressure gradually increases from 0 during injection and filling, the profile (variation characteristic) of mold clamping force gradually increases as the injection pressure varies. Further, the mold clamping force during injection and filling is set to a minimum value with which the mold does not open, whereby energy saving ability is enhanced. Further, it is possible to prevent the mold 1 from deteriorating. Further, a low pressure mold clamping condition can be basically established during injection and filling, and accordingly, inferior molding such as gas burning can be reduced.

Although the preferred embodiment of the present invention has been detailed, the present invention should not be limited to this embodiment in which the hydraulically driven injection molding machine (mold clamping cylinder) has been exemplified, the present invention can be also applied to a motor driven injection molding machine (mold clamping cylinder) using a servo-motor for torque control. Further, any modification can be applied to the detailed arrangement, the shape, the technique and the like, without departing the scope of the conception and spirit of the present invention.

What is claimed is:

1. A method of controlling a mold clamping force of an injection molding machine, said method comprising the steps of:

detecting an injection pressure of an injection cylinder of said injection molding machine with a pressure detector as a pressure detection value;

inputting said pressure detection value into a controller;

calculating a first mold clamping force value with said controller by multiplying said pressure detection value with a predetermined value if said pressure detection value increases from a previous detection; and controlling a mold clamping piston-cylinder arrangement with said controller as a feed-back control loop, said mold clamping piston-cylinder arrangement having a second mold clamping force value, said controller through said feed-back loop adjusts said second mold clamping force value by equating said second mold clamping force value with said first mold clamping force value, whereby power consumption of said injection molding machine is substantially reduced while machine life of said injection molding machine is substantially increased.

2. The method of claim 1, further comprising the step of:
    prior to detecting said injection pressure, setting said second mold clamping force value to a zero value.

3. The method of claim 1, further comprising the step of:
    calculating said predetermined value by using an equation comprising (α*S*β), where α is a charging rate of molding material entering a mold cavity of said mold clamping piston-cylinder arrangement, S is an entire area of a molding article, and β is a safety factor.

4. The method of claim 3, further comprising the steps of:
    detecting a position of a screw in a barrel cylinder of said injection molding machine, said barrel cylinder having predetermined charging rate values assigned to sections of said barrel cylinder where said barrel is divided into n sections, where n is a whole number; and changing said charging rate to one of said predetermined charging rate values according to said position of said screw.

5. The method of claim 3, further comprising the step of:
    changing said charging rate to one of several predetermined values according to a predetermined period of time.

6. The method of claim 1, further comprising the step of:
    detecting a position of a moveable die with a position detector, said moveable die being connected to said mold clamping piston-cylinder arrangement, said position detector being connected to said controller; and when said die moves, stopping said injection pressure, changing said predetermined value, and resetting said second mold clamping force value to a zero value.

* * * * *